Figure 1:
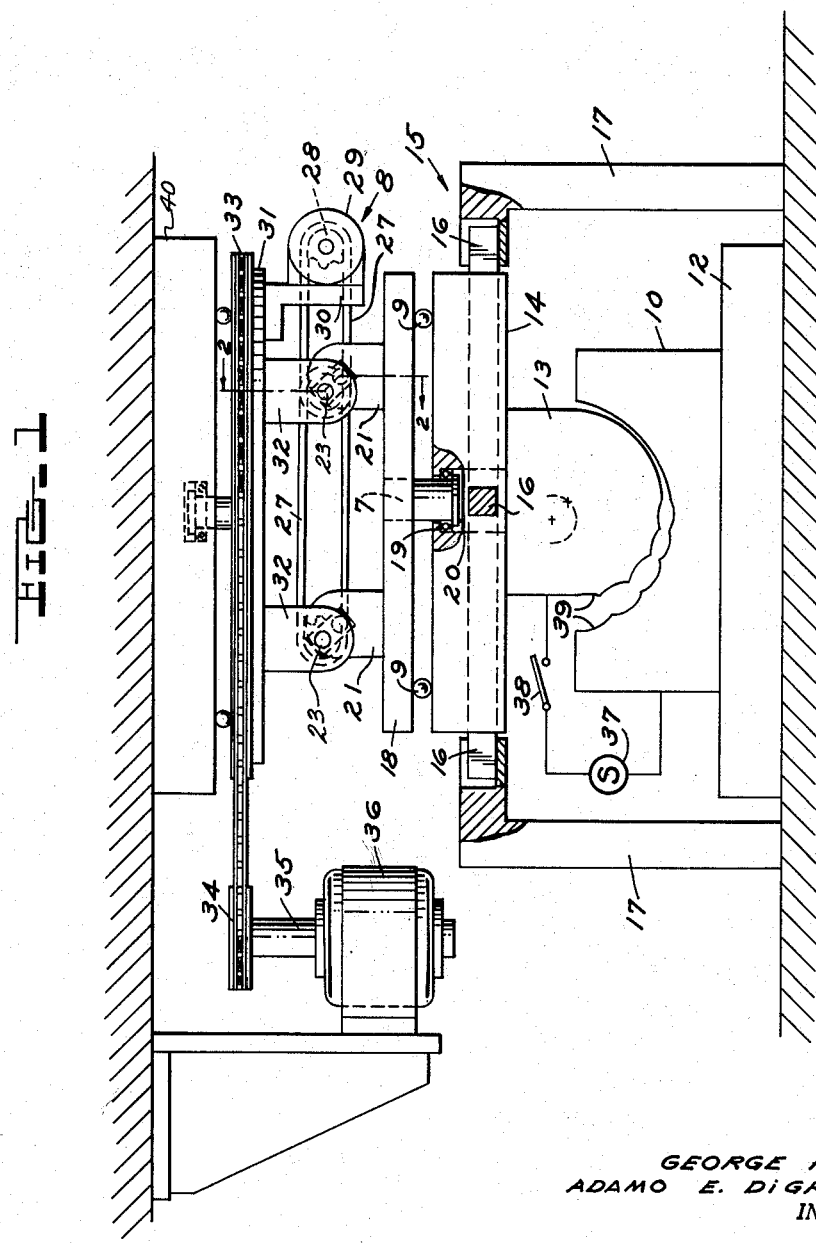

Dec. 10, 1963   G. PASCOE ET AL   3,114,029
METHOD OF FINISHING SURFACES
Filed Dec. 22, 1961   2 Sheets-Sheet 1

GEORGE PASCOE
ADAMO E. DiGREGORIO
INVENTORS

BY J. R. Faulkner
J. H. Oster
ATTORNEYS

GEORGE PASCOE
ADAMO E. DiGREGORIO
INVENTORS

United States Patent Office 3,114,029
Patented Dec. 10, 1963

3,114,029
METHOD OF FINISHING SURFACES
George Pascoe, Dearborn, and Adamo E. Di Gregorio, East Detroit, Mich., assignors to Ford Motor Company, Dearborn, Mich., a corporation of Delaware
Filed Dec. 22, 1961, Ser. No. 161,556
11 Claims. (Cl. 219—69)

This invention relates to a method and mechanism for finishing surfaces. More particularly, the invention relates to a method and mechanism for the removal of cusps from numerically contoured surfaces.

Numerical contouring is a process wherein a machine tool is controlled by a computer to cut a desired surface contour. The computer may be programmed to generate signals which cause the cutting element of the machine tool to move along a selected three-dimensional curve. Following the completion of one of such curves the cutting tool is moved to a position adjacent the first curve, and a second three-dimensional curve is cut. This process is repeated until a desired surface contour is completed.

As a result of the numerical contouring of a surface, irregularities or more particularly cusps remain on the surface of the part formed. The height and spacing of the cusps vary according to the distance between adjacent curve cuts made by machine tool and the size of the cutting element. The height and the spacing of the cusps can be controlled by the computer. It should be noted that in the case of mating parts the computer may be programmed to cause the cusps to be aligned.

Ordinarily, the cusps caused by numerical contouring require manual removal. It is the purpose of the invention to avoid costly and time-consuming manual removal by providing a method and mechanism for automatically removing these cusps.

The method and mechanism hereinafter described in detail utilizes the well-known process of electro-discharge machining or finishing. In this process the part or parts to be finished are utilized as electrodes. The electrodes are separated and are electrically charged by a source of electric potential. The electrodes are moved toward each other until an electric discharge or spark jumps the gap separating the electrodes. The electric discharge or spark causes electrode erosion and consequently the parts serving as electrodes are finished. The above process is described in detail in United States Patent 2,501,954.

The invention recognizes the principle that the spark will jump preferentially to the highest points on the electrode, thereby eroding the high points on the parts serving as electrodes. The recognition of this principle coupled with an appreciation of the nature of the cusps created by numerical contouring is the basis of the invention.

The preferred embodiment of the invention embraces a method and mechanism for removing the cusps from two numerically contoured mating parts. The contoured parts are mounted as electrodes in an electro-discharge machine and connected to an electric charging device. One of the parts is then moved toward the other part along an eccentric path, causing successive spark discharge of the cusps along the surface of the parts being finished. The spark discharge causes the cusps to be removed, thus finishing the surface of the parts.

The preferred embodiment also provides a means for rotating the eccentric path. The rotation of the eccentric path permits the cusps which lie in a different vertical plane to serve as electrodes and thus be removed. The combined motions enable the removal of cusps on irregular surfaces by electro-discharge techniques.

It should be understood that the method and mechanism hereinafter described in detail is not limited to cusp removal, to mating parts or to numerically contoured surfaces.

The object of the invention is to provide a method and a mechanism for the removal of surface irregularities.

Another object of the invention is the provision of a method for removing surface irregularities from mating parts while generating an accurate and uniform stock thickness allowance.

Another object of the invention is the provision of a method and mechanism for automatically removing surface irregularities which will require a minimum of additional finishing.

Another object of the invention is the provision of a method and mechanism to remove cusps from the numerically contoured surface of two mating parts.

Other objects and advantages will appear from the following detailed description of the preferred embodiment.

Figure 2:
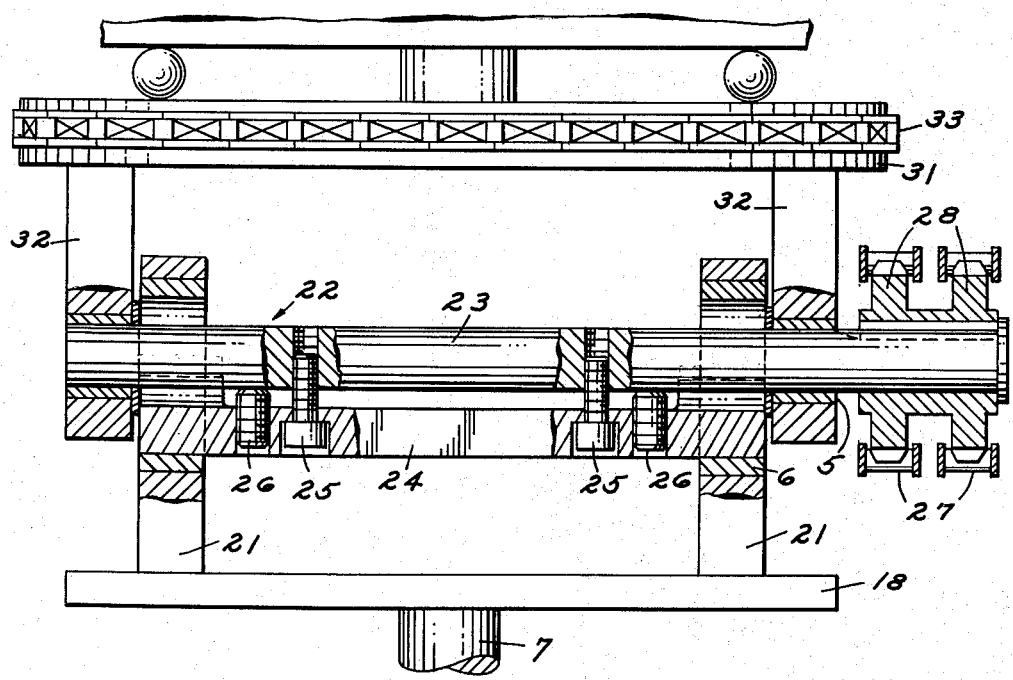

In the drawings:

FIGURE 1 is a schematic front view of the fixture utilized to cause an eccentric and rotational movement; and FIGURE 2 is a sectional elevation view taken along the line 2—2 of FIGURE 1.

Referring to FIGURE 1, a part 10 is rigidly mounted on the base 12 of an electro-discharge machine. A part 13 is rigidly mounted on the plate 14 of the fixture 15. The plate 14 has two support bars 16 which are rigidly attached to the plate 14 and mounted on the machine supports 17. Support bars 16 are mounted at right angles to one another and slidably engage the machine supports 17.

The fixture 15 provides a means for eccentrically oscillating the part 13 and for rotating the plane of oscillation. The fixture 15 comprises the rotatable plate 18 which is rotatably attached to the plate 14 by means of the bearing member 19 and the abutment member 20 on the shaft 7. The rotatable plate 18 is supported by the ball bearings 9 which are rotatably attached to the plate 14.

The rotatable plate 18 has two pairs of eccentric transmission members 21 rigidly attached thereto. As clearly shown in FIGURE 2, the eccentric transmission members 21 support the eccentrics 22. The eccentrics 22 comprise shafts 23 having eccentric members 24. The eccentric members 24 are formed from longitudinal half sections of a shaft which rotate in the bearings 6. The shafts 23 rotate in the bearings 5 mounted in the support elements 32. The support elements 32 are fixed to a rotatable plate 31 and thereby prevented from moving in a vertical direction.

The rotation of the shafts 23 cause the eccentric members 24 to rotate in the bearings 6, thereby actuating the eccentric transmission members 21, the rotatable plate 18 and the plate 14. The rotatable plate 18, the plate 14 and the attached parts are, thereby, moved along an eccentric path (FIGURE 1). The eccentric path is essentially a curved path which is caused by an eccentric or an equivalent member.

The eccentric members 24 are attached to the shafts 23 by the fastening means 25 and the set screws 26. The fastening means 25 and set screws 26 cooperate to permit adjustment of the position of the longitudinal axis of the shafts 23 relative to the eccentric members 24, thereby providing an adjustable eccentric.

The shafts 23 are connected by a chain drive 8 (FIGURE 1). The chain drive 8 is composed of chains 27 and sprockets 28. The shafts 23 may be drivingly connected by other equivalents such as a shaft and gear means. A driving means 29 is connected to one of the chains 27 to drive the shafts 23. It is well within the scope of the invention to substitute various types of driving means and to connect the driving means 29 to the shafts 23 by any of the well-known drive transmission elements. The driving means 29 actuates the shafts 23 to cause the eccentric motion.

The driving means 29 is supported by a support bracket 30 that is rigidly attached to the second rotatable plate 31 which is rotatably mounted to a fixed plate 40 (FIGURE 1). The support elements 32 are rigidly attached to the second rotatable plate 31. The second rotatable plate 31 has a sprocket or gear portion 33 which is driven by the gear or sprocket 34 directly or through a chain drive. The sprocket 34 is rigidly mounted on shaft 35 of a second driving means 36. The second driving means 36 may be a motor which is capable of being controlled for reciprocating, oscillating, or intermittent movement. The rotation of the shaft 35 of the second driving means 36 will cause the second rotatable plate 31 and the first rotatable plate 18 to rotate as a unit.

The above-described fixture is mounted in an electro-discharge machine, such as the type descrbed in United States Patents 2,441,319 and 2,778,924. The parts 10 and 13 are connected across an electrical source 37.

In operation, the second driving means 36 may be actuated to rotate the first and second rotatable plates 18 and 31 to a selected angle. With the rotatable plates 18 and 31 at the selected angle, the driving means 29 is energized to rotate the shafts 23 which cause the eccentric transmission members 21 and the rotatable plate 18 to move in an eccentric path. The eccentric motion of the rotatable plate 18 will, in turn, cause the plate 14 and the attached part 13 to move in an eccentric path toward the part 10. With the switch 38 in a closed position, the movement of the part 13 in an eccentric path will cause a spark to jump across the gap separating the parts 10 and 13. The spark will tend to jump from the cusp to the cusp, thereby tending to erode the cusps.

Assuming the eccentric motion to be in a clockwise direction as the part moves from the right to the left, the spark discharge will tend to progress from the right side of the part 10 to the left side of the part 10. The continued eccentric oscillation or rotation of the part 13 with switch 38 in the closed position will result in the removal of the cusps 39 from the parts 10 and 13. It should be noted that the removal of the cusps 39 from the parts 10 and 13 will result in the existence of a gap between the parts 10 and 13. If the parts 10 and 13 form a punch-and-die combination, the finished gap will serve as an accurate stock allowance.

The second driving means 36 may be continually or periodically actuated to alter the vertical plane along which the eccentric movement takes place. Changing the vertical plane of oscillation permits cusps on different planes to be removed.

In operating the electro-discharge machine, an electric discharge rate of from 20,000 to millions of cycles per second may be utilized. The gap between the electrodes may be maintained between 0.0002 inch to 0.0015 inch. The potential difference between the electrodes may be on the order of 50 volts.

It should be noted that as the part or parts being finished are eroded by the spark discharge, the gap changes; therefore it may be necessary to continually adjust the gap between the electrodes or the potential difference. The gap and potential difference can be adjusted to cause the final gap to correspond to a selected stock allowance. Means for adjusting the gap and the potential are provided in the electric-discharge machines currently being marketed. Preferably, the gap between the electrode and the work piece is submerged in a coolant.

It will be understood that the invention is not to be limited to the exact construction shown and described and that various changes and modifications may be made without departing from the spirit and scope of the invention, as defined in the appended claims.

We claim:
1. The method of removing irregularities from the surface of at least two mating parts comprising: causing one of said parts to become electrically charged, causing the other of said parts to become electrically charged, and causing said parts to be repeatedly moved along a path that permits the irregularities of the part surfaces to periodically serve as electric-discharge electrodes, thereby causing the surface irregularities of the parts to be removed.

2. The method of removing irregularities from the surface of a part comprising: causing said part to become electrically charged, causing an electrode to become electrically charged, and causing said part to be repeatedly moved along a path toward said electrode that permits the irregularities on said part surface to periodically serve as spark-discharge electrodes, thereby causing the surface irregularities of the parts to be removed.

3. The method of removing cusps from the numerically contoured surfaces of two mating parts comprising: causing one of said parts to become electrically charged, causing the other of said parts to become electrically charged, and causing said parts to be repeatedly moved along a path that enables a spark to periodically jump from the cusps on the surface of one part to the cusps on the surface of the other part, thereby causing the cusps to be removed and finishing the surfaces of the parts.

4. The method of removing irregularities from the surface of at least two mating parts comprising: causing one of said parts to become electrically charged, causing the other of said parts to become oppositely charged, and causing one of said parts to be repeatedly moved along an eccentric path that permits the irregularities on the surface of the parts to periodically serve as electric-discharge electrodes, thereby causing the irregularities to be removed and finishing the surfaces of the parts.

5. The method of removing irregularities from the surface of at least two mating parts comprising: causing one of said parts to become electrically charged, causing the other of said parts to become oppositely charged, and causing one of said parts to be moved along a vertically eccentric path that permits the irregularities on the surface of the parts to serve as spark-discharge electrodes, thereby causing the irregularities to be removed and finishing the surfaces of the parts.

6. The method of removing irregularities from the surface of at least two mating parts comprising: causing one of said parts to be electrically charged, causing the other of said parts to become oppositely electrically charged, and causing said parts to be repeatedly moved along an eccentric path that enables a spark discharge to progress along the surface of said parts, said spark discharge periodically traversing the gap separating an irregularity on the surface of one part from the irregularity on the surface of the other part, thereby causing the irregularities to be removed and finishing the surfaces of the parts.

7. The method of removing irregularities from the surface of at least two mating parts comprising: causing one of said parts to become electrically charged, causing the other of said parts to become oppositely electrically charged, causing one of said parts to be repeatedly moved along an eccentric path that permits the irregularities on the surface of the parts to serve as electric-discharge electrodes, said eccentric path lying in a selected vertical plane, altering the selected vertical plane, and repeating the step of causing one of said parts to be repeatedly moved along an eccentric path, thereby causing the irregularities which lie on a plurality of planes to be removed and finishing the surfaces of the parts.

8. The method of removing irregularities from the surface of at least two mating parts comprising: causing one of said parts to become electrically charged, causing the other of said parts to become oppositely electrically charged, causing one of said parts to be repeatedly moved along an eccentric path that permits the irregularities on the surface of the parts to serve as spark-discharge electrodes, changing the plane of movement of said eccentric path, and repeating said step of causing one of said parts to be repeatedly moved along an eccentric path, thereby causing the irregularities which lie in a plurality of planes to be removed and finishing the surfaces of the parts.

9. The method of removing irregularities from the surface of at least two mating parts comprising: causing one of said parts to become electrically charged, causing the other of said parts to become oppositely electrically charged, causing one of said parts to be repeatedly moved along a vertically eccentric path that permits the irregularities on the surface of the parts to serve as spark-discharge electrodes, said vertically eccentric path traversing a selected plane of movement, rotating the plane of movement of said vertically eccentric path, and repeating said step of causing one of said parts to be repeatedly moved along a vertically eccentric path, thereby causing the irregularities which lie in a plurality of planes to be removed and finishing the surfaces of the parts.

10. The method of removing cusps from the numerically contoured surfaces of two mating parts comprising: numerically contouring the surface of two mating parts, said mating parts having the cusps which result from numerical contouring properly aligned for electric-discharge machining, causing one of said parts to become electrically charged, causing the other of said parts to become electrically charged, and causing said parts to be repeatedly moved along a curved path that enables a spark to periodically jump from the cusps on the surface of one part to the cusps on the surface of the other path, thereby causing the cusps to be removed and finishing the surfaces of the parts.

11. The method of removing cusps from the numerically contoured surfaces of two mating parts comprising: causing one of said parts to become electrically charged, causing the other of said parts to become electrically charged, and causing said parts to be repeatedly moved along a curved path that enables a spark to periodically jump from the cusps on the surface of one part to the cusps on the surface of the other part, thereby causing the cusps to be removed and finishing the surfaces of the parts.

References Cited in the file of this patent
UNITED STATES PATENTS

| | | |
|---|---|---|
| 2,773,968 | Martellotti | Dec. 11, 1956 |
| 2,800,566 | Matulaitis | July 23, 1957 |

FOREIGN PATENTS

| | | |
|---|---|---|
| 206,251 | Austria | Nov. 25, 1959 |